United States Patent
Sarma et al.

(10) Patent No.: US 7,464,116 B2
(45) Date of Patent: Dec. 9, 2008

(54) METHOD AND APPARATUS FOR CLONING FILESYSTEMS ACROSS COMPUTING SYSTEMS

(75) Inventors: Joydeep Sen Sarma, Sunnyvale, CA (US); Abhijeet P. Gole, Campbell, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 316 days.

(21) Appl. No.: 11/321,431

(22) Filed: Dec. 28, 2005

(65) Prior Publication Data

US 2007/0162515 A1     Jul. 12, 2007

(51) Int. Cl.
G06F 17/30  (2006.01)
G06F 7/00   (2006.01)

(52) U.S. Cl. .................. 707/201; 707/10; 707/100
(58) Field of Classification Search ............... 707/10, 707/201
See application file for complete search history.

(56) References Cited

U.S. PATENT DOCUMENTS

| | | | | |
|---|---|---|---|---|
| 5,367,698 A * | 11/1994 | Webber et al. | ............... | 709/203 |
| 5,604,862 A * | 2/1997 | Midgely et al. | ............. | 711/161 |
| 5,819,292 A * | 10/1998 | Hitz et al. | ............... | 707/203 |
| 5,884,328 A * | 3/1999 | Mosher, Jr. | ............... | 707/202 |
| 6,397,307 B2 * | 5/2002 | Ohran | ............... | 711/161 |
| 6,584,582 B1 * | 6/2003 | O'Connor | ............... | 714/21 |
| 6,636,879 B1 * | 10/2003 | Doucette et al. | ............ | 707/205 |
| 6,892,211 B2 * | 5/2005 | Hitz et al. | ............... | 707/202 |
| 7,035,881 B2 * | 4/2006 | Tummala et al. | ............ | 707/204 |
| 7,072,916 B1 * | 7/2006 | Lewis et al. | ................ | 707/205 |
| 7,100,089 B1 * | 8/2006 | Phelps | ................ | 714/42 |
| 7,191,304 B1 * | 3/2007 | Cameron et al. | ............ | 707/204 |
| 2002/0083120 A1 * | 6/2002 | Sotis | ............... | 709/200 |
| 2002/0133491 A1 * | 9/2002 | Sim et al. | ............... | 707/10 |
| 2003/0070043 A1 * | 4/2003 | Merkey | ............... | 711/114 |
| 2005/0065985 A1 | 3/2005 | Tummala et al. | | |
| 2005/0065986 A1 * | 3/2005 | Bixby et al. | ............... | 707/204 |
| 2005/0246401 A1 * | 11/2005 | Edwards et al. | ............ | 707/205 |
| 2006/0277221 A1 * | 12/2006 | Zavisca et al. | ............ | 707/201 |
| 2007/0011401 A1 * | 1/2007 | Zhang et al. | ................ | 711/114 |

(Continued)

FOREIGN PATENT DOCUMENTS

WO     WO 03/105026     12/2003

(Continued)

OTHER PUBLICATIONS

"X-Ray: A Non-Invasive Exclusive Caching mechanism for RAIDs"—Lakshmi N. Bairavasundaram, Muthian Sivathanu, Andrea C. Arpaci-Dusseau and Remzi H. Arpaci-Dusseau—ACM SIGARCH Computer Architecture News, vol. 32, issue 2 (Mar. 2004) pp. 176-187.*

(Continued)

Primary Examiner—Jean Bolte Fleurantin
Assistant Examiner—Anh Ly
(74) Attorney, Agent, or Firm—Blakely, Sokoloff, Taylor & Zafman LLP (57) ABSTRACT

Data storage methods and apparatus combining read-only and read-write storage are described. Data may be located by information maintained in a filesystem; each data block is stored in either the read-only storage or the read-write storage.

18 Claims, 6 Drawing Sheets

U.S. PATENT DOCUMENTS

2007/0088702 A1*  4/2007  Fridella et al. ................ 707/10
2007/0220206 A1*  9/2007  Kobayashi et al. .......... 711/114

FOREIGN PATENT DOCUMENTS

WO    WO 2005/111773    11/2005

OTHER PUBLICATIONS

"DualFS: A new Journaling file system without meta-data duplicate"—Juan piernas, Toni Cortes and Jose M. Garcia—International Conference on Supercomputing, New York, USA ACM—2002, pp. 137-146.*

Siddha, S. B. et al., "A Persistent Snapshot Device Driver for Linux", Proceedings of Annual Linux Showcase and Conference, Nov. 10, 2001, pp. 173-182, XP002317993, section 3.1.3 figure 4.

* cited by examiner

METHOD AND APPARATUS FOR CLONING FILESYSTEMS ACROSS COMPUTING SYSTEMS

FIELD OF THE INVENTION

The invention relates to filesystem and data storage management. More specifically, the invention relates to low-level filesystem sharing coordination.

BACKGROUND

A filesystem is a data structure (or set of data structures) and associated logic that facilitate tasks related to storing data in a computer system: allocating and freeing storage space on mass storage devices; reading and writing data; creating, modifying and deleting files; maintaining hierarchical directory structures; and so forth. Filesystem data structures are typically fairly complex, with interdependent fields that must be maintained consistently to avoid data corruption or loss. Various techniques and protocols to maintain filesystem consistency despite hardware errors and failures, power loss, and similar exigencies are known in the art. For example, several mass storage devices such as hard disk drives can be combined into a Redundant Array of Independent Disks ("RAID") and operated so that the failure of any single device will not affect the availability of data stored on the RAID. This addresses the low-level need for reliable storage of data bits, including the data bits that make up the filesystem data structures. At a higher logical level, filesystem changes can be made robustly by, for example, preparing a tentative set of changes, then activating all the tentative changes simultaneously with a single, atomic "commit" operation. This can help avoid inconsistencies that might arise if several related data structure changes are involved in a filesystem operation, but the system or storage units fail partway through the sequence.

Filesystems and their underlying mass storage systems are usually controlled by a single computing system, such as a file server or a block-based storage server. Data caching, consistency, and coordination issues make it difficult or impossible in the general case to permit two independent systems to modify a filesystem simultaneously. Consequently, the single system (e.g., file server) can become a bottleneck in serving file operation requests from clients: it may saturate its communication resources for receiving requests and sending responses to clients; it may exhaust its processing or memory resources for performing the requested operations; or it may reach the capacity of the interface(s) over which it exchanges data with the mass storage devices. In a large-capacity storage system, this last resource is quite likely to be used up at some point, because disks can be added at will to increase the amount of storage available. Eventually, the aggregate data transfer bandwidth of all of the disks will exceed that of the controlling system.

Methods of making use of the bandwidth of a large cluster of mass storage devices, and of permitting at least some filesystem operational load to be moved from the main controlling system, may be of significant value in the field.

SUMMARY OF THE INVENTION

A filesystem tracks the location of the data blocks comprising data files, where each data block is stored either on a read-only storage system or on a read-write storage system. If a data block on the read-only storage system is to be modified, filesystem logic moves the block to the read-write storage system and updates the filesystem data structures accordingly.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION OF DRAWINGS

Figure 1:
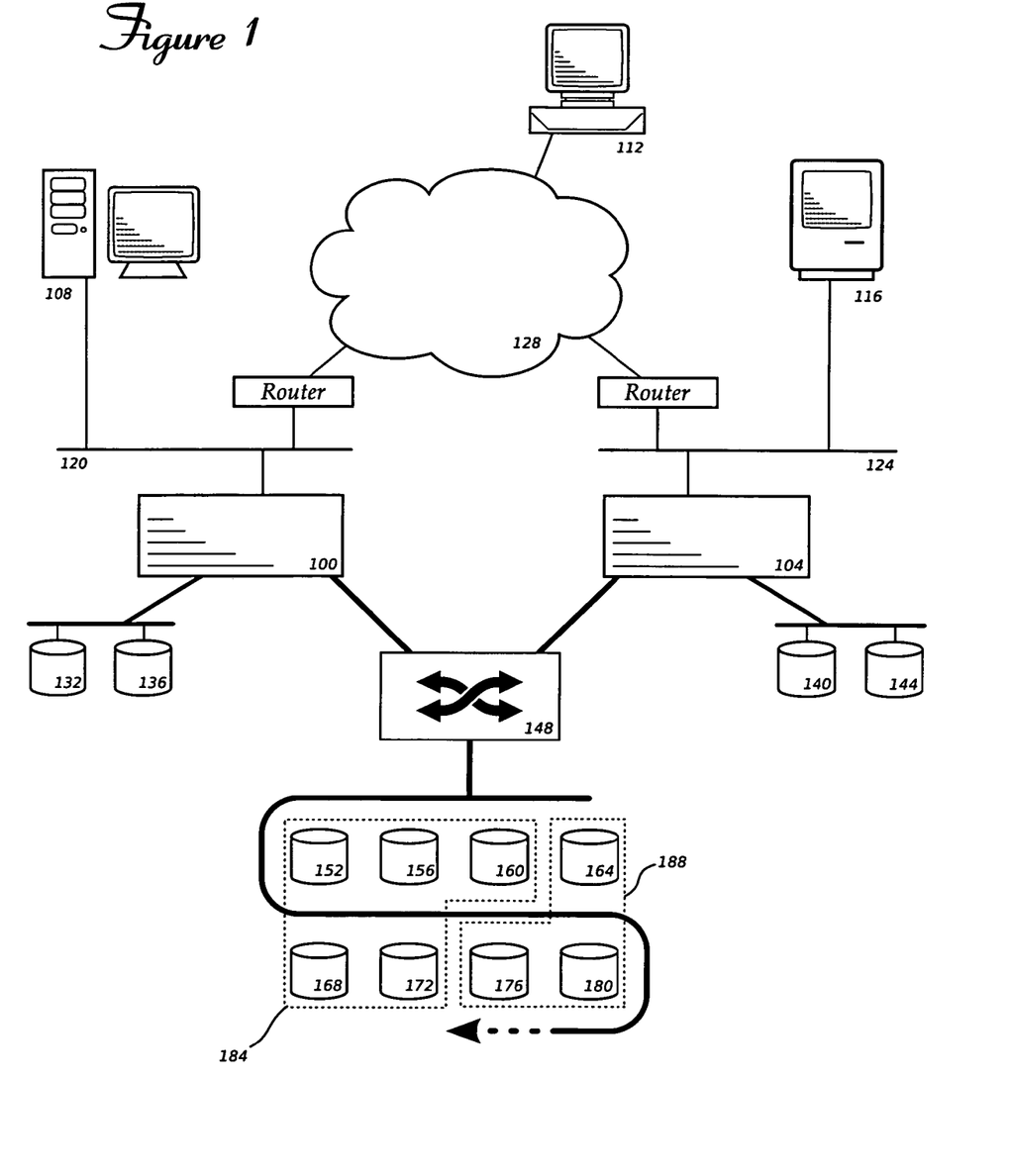
FIG. 1 shows a sample environment that implements an embodiment of the invention.

FIG. 1 shows a computing environment that can support an embodiment of the invention. Systems 100 and 104 are storage servers that provide data storage and retrieval services to clients 108, 112 and 116. (A "storage server" may be a traditional file server, or a server to provide data storage in units other than files—for example, in fixed-size blocks. The first type of server is often associated with the acronym "NAS" for Network Attached Storage, while the second type goes by the acronym "SAN" for Storage Area Network. Both types of server functionality are available commercially, for example in the Fabric-Attached Storage or "FAS" product line from Network Appliance, Inc. of Sunnyvale, Calif.) Clients can communicate with the storage servers 100 and 104 through local-area networks ("LANs") 120 and 124, or over a wide-area network ("WAN") 128 such as the Internet. Requests to create or delete files, to list directories, to read or write data, or to perform similar filesystem-related operations are transmitted from clients to a storage server, and responses are sent back.

Each storage server 100, 104 will have at least one mass storage device to store data and instructions for its own use, as well as to store user data files and information about the filesystem within which the files exist. In FIG. 1, each storage server has two "private" disks that are accessible only to that server (server 100 has disks 132 and 136; server 104 has disks 140 and 144). In the exemplary embodiment of the invention shown here, each storage server is also connected to a Fibre Channel ("FC") switch 148, which mediates access from the servers to an array of disks 152-180. Each server may be able to read or write to any of the disks in the FC array through switch 148, but software executing on the servers may cooperate to respect a convention that, for example, disks in group 184 may only be written by server 100 and are read-only with respect to server 104, while disks in group 188 may only be written by server 104 and are read-only to server 100. Henceforth, references to "read-only storage systems" will include storage systems on which data cannot be modified (e.g. because the data on the storage media is fixed and unmodifiable); systems on which data modification is prevented (e.g. by a write-locking switch or signal); as well as systems on which data could be written, but is not (e.g. by convention, agreement, or software design).

The servers may manage the raw data storage provided by the disks shown in FIG. 1 as a Redundant Array of Independent Disks ("RAID"), or some intermediate or lower-level hardware, firmware, or software entity (not shown) could provide reliable storage without any special arrangements by the servers. Embodiments of the invention operate logically at a higher level of abstraction, so the specific details of the storage subsystems will not be considered further. Instead, embodiments will be described with reference to one or more "storage systems" that provide either read-only or read-write access to a series of data blocks, each data block having a unique, sequential identifying number from zero to the total number of blocks in the storage volume. An Integrated Device Electronics ("IDE") or Small Computer System Interface ("SCSI") hard disk provides such an interface, and a RAID can be operated in this way also. However, note that a data file in a filesystem can also be viewed as a sequence of read-only or read-write blocks, so embodiments of the invention can be nested: a clone filesystem according to an embodiment may be constructed in a data file, which is itself a file on a lower-level filesystem—even another clone filesystem. Applications for one or two levels of nesting will be mentioned below; greater numbers of levels are possible, but may not be particularly useful.

Figure 2:
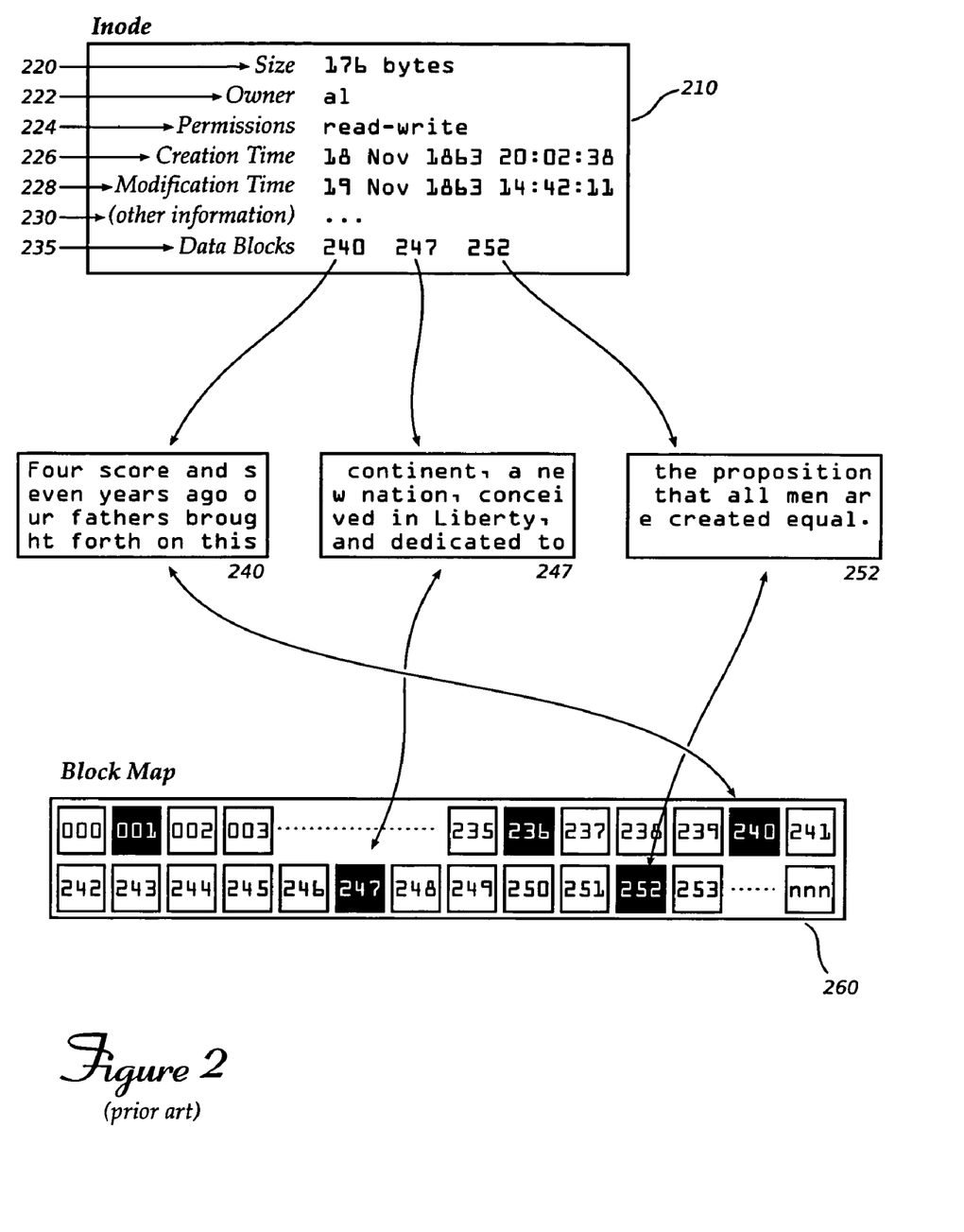
FIG. 2 shows some representative data structures that may be incorporated in a filesystem.

FIG. 2 shows a simplified representation of some of the data structures that may be included in a filesystem. A first structure called an "inode" 210 is a metadata container to contain metadata about a file in the filesystem (metadata may include, for example, the file's size 220, owner 222, permissions 224, creation time 226, modification time 228, and other information 230). The inode may also contain data block numbers 235 so that the file contents can be located on the storage volume. Every file is associated with an inode. The file associated with inode 210 is 176 bytes long, and those bytes are stored in data blocks 240, 247 and 252. (In this simple illustration, data blocks of only 64 bytes are used, but in practical systems, larger blocks—usually in sizes that are powers of two—may be used.) This simple filesystem also contains a block map structure 260, which indicates, for each data block in the filesystem, whether the block is in use. For example, in addition to blocks 240, 247 and 252 which are in use by the data file corresponding to inode 210, blocks 001 and 236 are marked "in use" in block map 260. Inodes themselves and the block map are data that may be stored in some of the data blocks of a storage system.

Note that neither of the data structures described above contains the file's name. The filesystem can implement named files and a hierarchical directory structure by placing the names and corresponding inode numbers in a file (which is itself associated with an inode), and treating that file specially as a directory. One inode in a filesystem is typically designated as the "root directory" of the filesystem; all other files should be accessible through an inode associated with a filename in the root directory or in a hierarchical descendant of the root directory.

Figure 3:
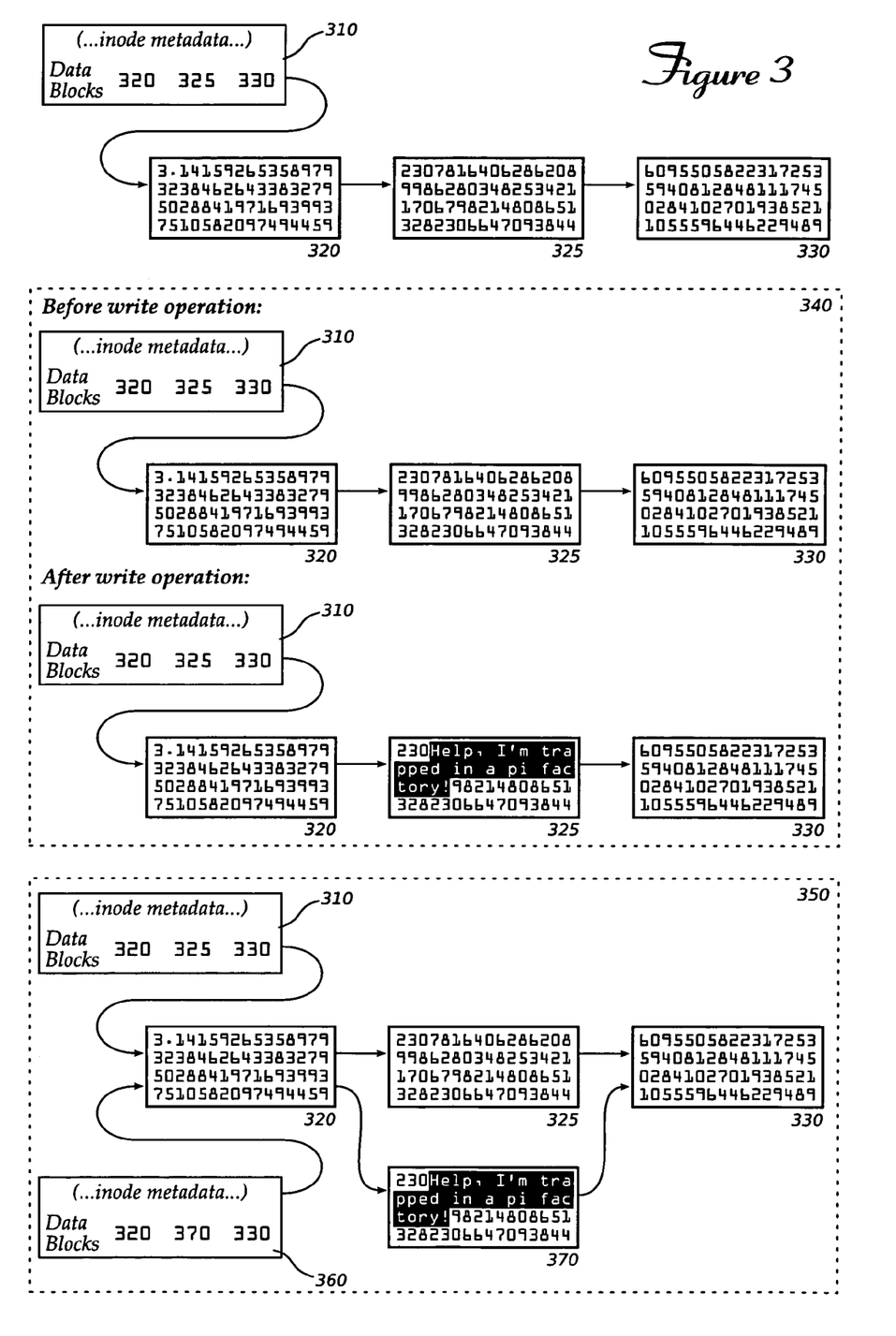
FIG. 3 shows several ways a file's contents can be modified.

The filesystem data structures described with reference to FIG. 2 support an operational mode that is used by embodiments of the invention. Consider a filesystem that contains various files and directories. FIG. 3 shows one of those files: inode 310 contains information to locate data blocks 320, 325 and 330. If the file contents are modified by a write operation, the new data might simply be placed into the currently-allocated data blocks, overwriting some of the existing contents as shown in before-and-after inset 340. However, it may be useful to preserve the state of the file at a particular time, so instead of overwriting the existing file contents, a new inode 360 might be allocated and configured to refer to a new sequence of data blocks. Data blocks that are not modified can be shared between the original inode 310 and the new inode 360. Inset 350 shows that original inode 310 continues to list data blocks 320, 325 and 330, while inode 360 lists data blocks 320, 370 and 330. Data block 370 contains the contents of block 325 as modified by the write operation. The original version of the file is available through inode 310, while the modified version is available through inode 360. Thus, inode 310 describes the file at a point in time just before modifications began to be made through another inode. Eventually, inode 360 may be preserved as a second point-in-time version, and further modifications may be made within a third sequence of data blocks located by a third inode. The versions persist as long as the inodes describing them are maintained. They are read-only, because some of the data blocks from a file image may be shared with other file images (or with the active file), so modifications made through an image inode might cause unwanted changes in other files as well. For example, if a previously-saved image from a first time and a second image from a later time happened to share a data block, and the shared block was allowed to be modified through an inode from the second image, the same change would appear in the file in the first image. The change might be unexpected by software that referred to the first image, and could cause incorrect operation. The images described above will be referred to as read-only, persistent point-in-time images ("RPPI"). RPPIs are like the Snapshot® functionality available in storage server products from Network Appliance, Inc. of Sunnyvale, Calif.

RPPIs can be made of directories, too, since they are simply files that are treated specially for some purposes. Thus, the filesystem data structures can support an RPPI facility to preserve the state of any file, directory, or complete hierarchy at a point in time. Future modifications to the files and directories occur within data block sequences identified by new inodes, while inodes and blocks that are not modified can be shared with one or more RPPIs.

Again, an RPPI is a read-only construct, because any of the data blocks may be shared with another, active filesystem. If the shared data blocks were modified through operations on the RPPI, the changes would appear in the other filesystem even though no corresponding write operation was performed on a file there. Care must be taken to ensure that the inodes and data blocks of the RPPI persist as long as any of them are shared with another filesystem.

Although an RPPI cannot be modified, it can serve as the basis of an independent, active filesystem containing files and directories that can be modified. Each such filesystem is called a "clone." A clone begins as an identical copy of the RPPI, but as files and directories are added, deleted and modified, new inodes and data blocks are allocated exclusively to the clone, replacing or augmenting those shared with the RPPI.

Storage servers 100 and 104 in FIG. 1 can use the RPPIs and clones described above as outlined in the flowchart of FIG. 4. First, one storage server establishes a filesystem on a storage system to which another storage server has read-only access (410). In the system configuration shown in FIG. 1, storage server 100 could establish this filesystem on the disks in group 184. Next, the storage server makes an RPPI of the filesystem (420). Then, the second storage server creates a clone based on the RPPI (430). Initially, this clone can simply point to the root inode of the RPPI; the second storage server can obtain all the data from the storage system because it has read access to that system.

Figure 4:
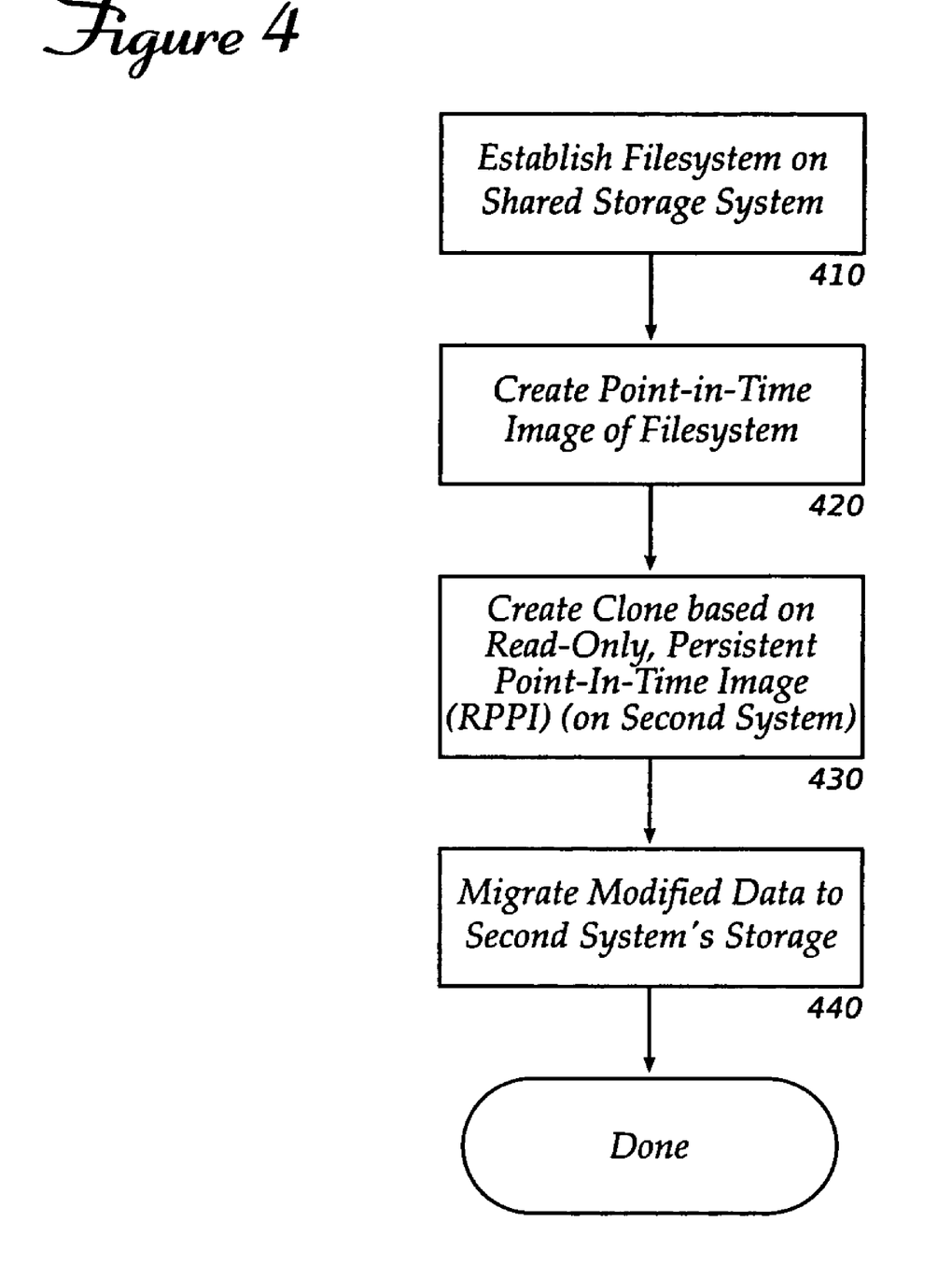
FIG. 4 outlines the operations of a cross-system filesystem clone.

As clients of the second storage server create, modify and delete files and directories on the clone, the second storage server allocates new inodes and data blocks on a second storage system to which it has read-write access (440). In the system configuration shown in FIG. 1, storage server 104 could store data for modifications to the clone on its private disks 140 and 144, or on the disks in group 188. Eventually, if every block shared from the RPPI is modified, all the data and inodes in the clone filesystem will reside on the second storage server's storage systems. The process of migrating RPPI data to the second storage server's storage can be expedited if the second storage server treats any access to shared data as an attempt to modify the data. For example, even if a client only attempts to read a file from blocks shared with the RPPI, the second storage server could allocate a new inode and data blocks in its own storage and copy ("migrate") the requested data there. The second storage server might even spend idle time migrating blocks from the RPPI to the clone.

A clone filesystem maintained by one storage server that is based on an RPPI from another storage server (a "cross-system clone") as described here may be useful in a number of situations. For example, the first storage server may serve requests from live clients such as web browsers or a relational database engine. Developers may wish to experiment with the real files and/or data, but such experimentation may degrade the server's performance or invalidate the data. However, if a second storage server is provided to serve a clone filesystem based on an RPPI of the live filesystem, these drawbacks can be avoided because no additional load is placed on the first storage server, and any changes to the data are confined to the clone. The second storage server may be able to use more of the bandwidth available from the shared storage system (to which the second storage server has read-only access). This may increase the value of the storage system by increasing the amount of useful work gotten from it. Additional storage servers can even be added to an environment to provide more clone filesystems based on the same RPPI.

Note that inodes in the clone will refer to data blocks that may be either on the read-only storage system (for data still shared with the RPPI) or on the read-write storage system (for data that has been migrated to the clone). The clone-serving storage server must be able to determine where a block resides so that it can retrieve the data correctly. One way of distinguishing RPPI blocks from clone blocks is to augment the block number with information to indicate a storage subsystem. However, this may require extensive changes to the filesystem data structures and support programs. For example, every block number listed in an inode might have to be changed to a block number and a storage system identifier, and every program that dealt with inodes would need to be modified to understand these new inodes. One embodiment of the invention solves this problem differently.

Recall that a filesystem includes a data structure to indicate whether each block in the storage system is in use. This data structure may be a block map as shown in FIG. 2, a list of block numbers that are "in use," or some other data structure that can answer the question, "is block n used?" (The term "block map" will be used for any data structure that can be used in this way.)

The block map (or equivalent) for the clone is initially empty, because the clone has no locally-stored changes from the RPPI. Thus, any block number listed in an inode will be considered "not in use" by the clone filesystem block map, and an embodiment of the invention can infer that the block number refers to the read-only storage system. When a data block is migrated to the clone, the clone's block map will be updated so that the allocated data block is marked "in use," and the storage server will know to retrieve the block's data from the read-write storage system. It should be clear that each data block is stored in exactly one of the read-only storage system and the read-write storage system, and the clone block map indicates which.

Further consideration of this approach will reveal several implications that should be borne in mind when implementing some embodiments of the invention. First, in a normal (non-cross-system clone) filesystem, the appearance in an inode of a block number that is marked as "not in use" in the block map indicates an inconsistency in the filesystem data structures, and may suggest that the filesystem is corrupted. In an embodiment of the invention, however, the clone block map's "not in use" indication really means "not present on the read-write storage system; get this data from the read-only storage system." Thus, although the low-level structures and contents of the clone block map may be the same as a prior-art block map, the meaning of the information in the block map is different. Second, in some embodiments, the range of block numbers on the read-only and read-write storage systems should be coextensive, so that when a data block is migrated from the RPPI to the clone, the same-numbered block can be used. Using block numbers this way permits the block map's meaning to be adjusted as described, and relieves the implementer of making larger changes to data structures and logic so that the clone-serving storage server can locate filesystem data blocks on either the read-only or read-write storage systems.

Figure 5:
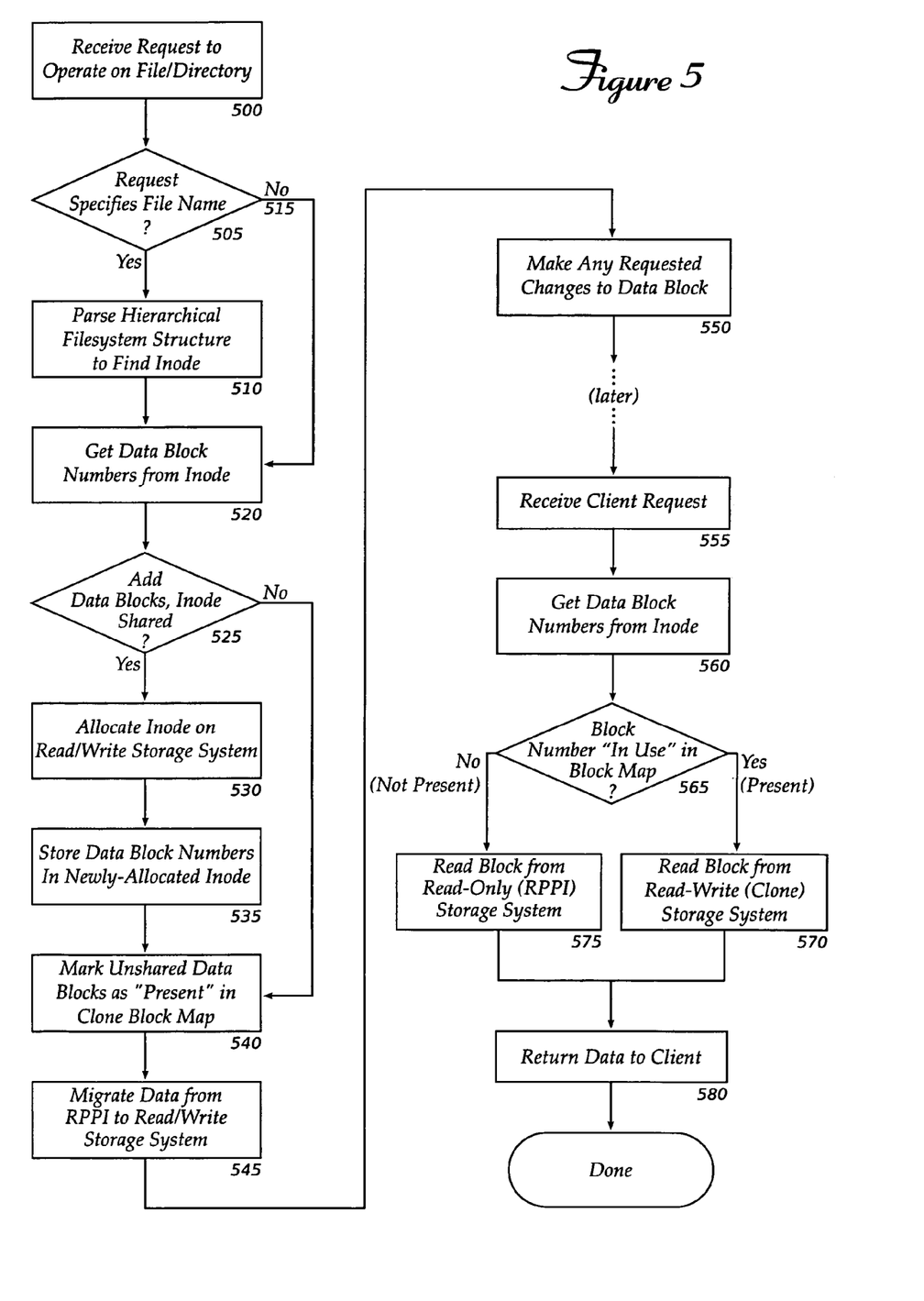
FIG. 5 details some operations of a cross-system filesystem clone.

FIG. 5 shows a detailed flowchart of some operations of a storage server operating a clone filesystem that refers to a base RPPI prepared by a different system. First, the server receives a request to perform an operation on a file or directory (500). The request may come from a client of the server, or may be generated by the storage server itself, for example as part of a filesystem grooming process such as the one described in paragraph [0023], where the server may spend some of its idle time migrating blocks from the RPPI to the clone. The operation may be a simple read or write, or a more complex operation such as a file or directory creation, renaming or deletion.

If the request refers to the file by name (505), the storage server will parse the hierarchical filesystem structure to locate the inode associated with the name (510). Some requests may refer to the inode directly, so the parsing operation can be skipped (515).

Once the inode is known, the data block numbers can be obtained from it (520). If data blocks are to be added or removed to the sequence in the inode, and the inode is still shared with the RPPI (525), a new inode is allocated on the read-write volume (530) and the block numbers are stored in it (535). Then, data blocks that are no longer to be shared from the RPPI are marked as "present" in the clone block map (540). The "present" marking may be identical to an ordinary filesystem's "in use" block map marking (refer to FIG. 2 and the associated description). However, because the meaning of clone block map entries is changed according to an embodiment of the invention, the "present" marking permits the storage server to determine whether the data block is present or not present on the read-write volume, rather than whether the block is in use. The data blocks are copied from the RPPI to the read-write volume (545), and finally any changes to the data that are specified by the request will be made in the data blocks on the read-write volume (550).

Later, when another access to the clone filesystem occurs (555), the server obtains block numbers from an inode (560), checks the block map to determine whether the data block is marked "present" or "not present," (565), and reads the block from the read-write storage system if "present" (570) or from the read-only storage system if "not present" (575). Then, the data can be processed according to the request, for example by returning the data to the client (580).

Building a clone filesystem inside a data file on a lower-level filesystem provides a useful level of abstraction with respect to data block numbers. Blocks within a data file can be numbered from zero to the number that fit within the file, without regard to a physical block number that might be used to obtain the contents of the block from an underlying hardware storage system. Thus, a single level of nesting (a filesystem within a file on a lower-level filesystem) permits the use of "virtual block numbers" that can be coextensive with the block numbers in an RPPI. In addition, the lower-level filesystem may support sparse files—that is, blocks that are allocated to the file but have not yet been filled with any data may not need to be taken from the pool of free blocks available to the lower-level filesystem. Therefore, the clone filesystem can be very efficient, using little more physical storage on the read-write storage system than is necessary to contain the differences between the RPPI and the clone.

Regarding implementation of the block map (or similar data structure) in the clone filesystem, a bitmap or equivalent indexed structure may provide good performance, but may also occupy a significant amount of storage space (one bit or other unit for each block in the RPPI, regardless of whether the block has been migrated to the clone). In systems where the done is only lightly modified from the RPPI, a list of block numbers that are present in the clone may require less space, but may not perform as well as a bitmap. In some embodiments, the block map data structure may change dynamically as the number of blocks on the read-write storage system increases. For example, while the number of blocks is below a threshold, a list may be used, but if the number of blocks exceeds the threshold, the block map could be changed to a bitmap structure.

Figure 6:
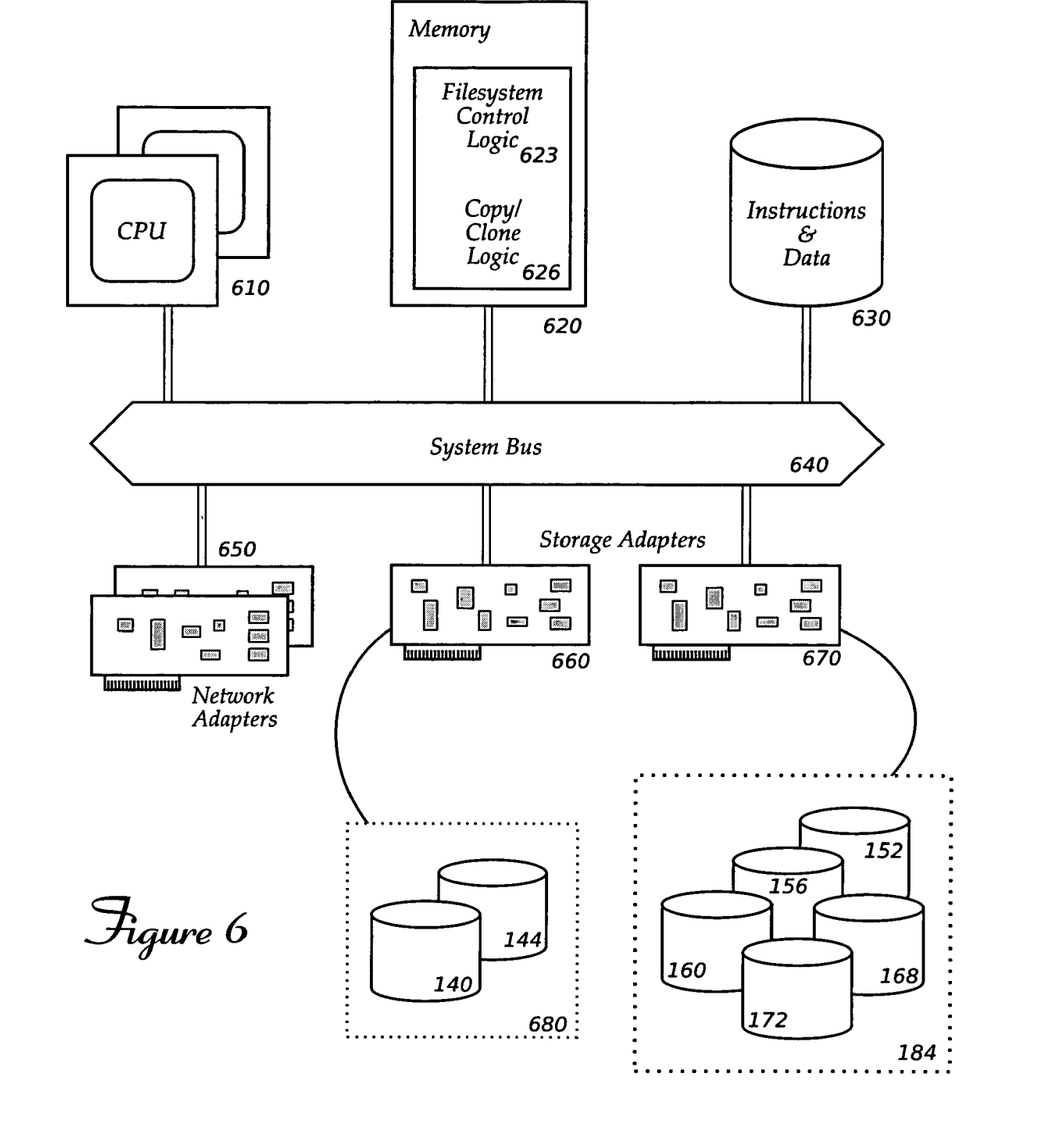
FIG. 6 is a block diagram of a system that could implement an embodiment of the invention.

FIG. 6 is a block diagram of hardware and software elements that may be present in a storage server that implements an embodiment of the invention. Central processing units ("CPUs") 610 coordinate the operations of the remaining hardware elements under the control of software instructions that may be stored in memory 620 or on a mass storage device such as hard disk 630. Memory 620 may contain, among other things, instructions and data to implement the filesystem control logic 623 as described above. In particular, logic to copy a data block from read-only storage to read-write storage and update a clone filesystem when the data block is to be modified might reside here (626). This system has several network adapters 650 for receiving requests from clients and sending responses. Storage adapters 660 and 670 connect to storage subsystems such as private disks 140 and 144 in a read-write storage subsystem 680, or shared disks 152, 156, 160, 168 and 172 in read-only storage subsystem 184. System bus 640 permits the various hardware components to communicate with each other and exchange commands and data.

An embodiment of the invention may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROMs), Read-Only Memory (ROMs), Random Access Memory (RAM), Erasable Programmable Read-Only Memory (EPROM), and a transmission over the Internet.

The applications of the present invention have been described largely by reference to specific examples and in terms of particular allocations of functionality to certain hardware and/or software components. However, those of skill in the art will recognize that file operations on a filesystem that is partially shared between two computing systems can also be produced by software and hardware that distribute the functions of embodiments of this invention differently than herein described. Such variations and implementations are understood to be apprehended according to the following claims.

We claim:

1. An apparatus comprising:
a read-only storage system to contain a read-only data block;
a read-write storage system to contain a modified data block;
a filesystem to indicate a location of a data block of a file; and
logic to copy a data block from the read-only storage system to the read-write storage system and update the filesystem if the data block is to be modified, wherein
each data block indicated by the filesystem is stored in exactly one of the read-only storage system and the read-write storage system;
the read-only storage system is shared between a first processor and a second processor, the first processor having read-only access to the storage system and the second processor having read-write access to the storage system, wherein the filesystem comprises:
a metadata container to contain a block number of a data block; and a block map to indicate which one of two storage systems contains the data block; and
the block map comprises a list of numbers of blocks that are present on the read-write storage system if a size of the list is less than a threshold size, and the block map comprises a bitmap of blocks of the read-write storage system if a number of blocks on the read-write storage system is greater than or equal to the threshold size.

2. The apparatus of claim 1 wherein the read-only storage system comprises a first redundant array of independent disks ("RAID"), and the read-write storage system comprises a second RAID.

3. A machine-implemented method of managing data blocks in a filesystem comprising:
storing a data block number in a metadata container;
storing data to make a present/not-present determination for a data block in a block map;
reading a data block corresponding to the data block number from a read-write storage system if the block map indicates that the data block is present; and
reading a data block corresponding to the data block number from a read-only storage system if the block map indicates that the data block is not present,
wherein each data block indicated by the block map is stored in exactly one of the read-only storage system and the read-write storage system;
the read-only storage system is shared between a first processor and a second processor, the first processor having read-only access to the storage system and the second processor having read-write access to the storage system, wherein the filesystem comprises:

a metadata container to contain a block number of a data block; and a block map to indicate which one of two storage systems contains the data block; and the block map comprises a list of numbers of blocks that are present on the read-write storage system if a size of the list is less than a threshold size, and the block map comprises a bitmap of blocks of the read-write storage system if a number of blocks on the read-write storage system is greater than or equal to the threshold size.

4. The machine-implemented method of claim 3, further comprising:

copying a data block from the read-only storage system to the read-write storage system;

updating the block map to indicate that the block is present; and updating a metadata container to reflect a number of the data block on the read-write storage system.

5. The machine-implemented method of claim 4 wherein the copying and updating operations are performed in response to a client request.

6. The machine-implemented method of claim 5 wherein the client request is a read request.

7. The machine-implemented method of claim 5 wherein the client request is a write request.

8. The machine-implemented method of claim 3 wherein the block map comprises a list of block numbers that are present on the read-write storage system.

9. The machine-implemented method of claim 3 wherein the block map comprises a the bitmap of blocks of the read-write storage system.

10. A computer-readable storage medium containing instructions that, when executed by a processor, cause the processor to perform operations comprising:

parsing a hierarchical filesystem structure to locate a data block of a file;

reading the data block of the file from a read-only storage device if the filesystem structure indicates that the data block is not present;

storing the data block on a writeable storage device if the data block is to be modified; and altering the hierarchical filesystem to indicate that the data block is stored on the writeable storage device, wherein each data block indicated by the filesystem is stored in exactly one of the read-only storage device and the writeable storage device;

the read-only storage system is shared between a first processor and a second processor, the first processor having read-only access to the storage system and the second processor having read-write access to the storage system, wherein the filesystem comprises:

a metadata container to contain a block number of a data block; and a block map to indicate which one of two storage systems contains the data block; and the block map comprises a list of numbers of blocks that are present on the read-write storage system if a size of the list is less than a threshold size, and the block map comprises a bitmap of blocks of the read-write storage system if a number of blocks on the read-write storage system is greater than or equal to the threshold size.

11. The computer-readable storage medium of claim 10, containing additional instructions to cause the processor to perform operations comprising:

receiving a request from a client to operate on the file; and transmitting a response to the client.

12. The computer-readable storage medium of claim 11, wherein the request is to read data from the file.

13. The computer-readable storage medium of claim 11, wherein the request is to write data to the file.

14. A system comprising:

a first array of storage devices to provide a read-only storage system;

a second array of storage devices to provide a read-write storage system;

a modifiable filesystem structure which contains at least one reference to data on the first array of storage devices;

a first processor which has read-only access to the first array of storage devices and which has read-write access to the second array of storage devices; and a second processor which has read-write access to the first array of storage devices and which has read-only access to the second array of storage devices, wherein each data block indicated by the filesystem structure is stored in exactly one of the first array of storage devices and the second array of storage devices;

the read-only storage system is shared between a first processor and a second processor, the first processor having read-only access to the storage system and the second processor having read-write access to the storage system, wherein the filesystem comprises:

a metadata container to contain a block number of a data block; and a block map to indicate which one of two storage systems contains the data block; and the block map comprises a list of numbers of blocks that are present on the read-write storage system if a size of the list is less than a threshold size, and the block map comprises a bitmap of blocks of the read-write storage system if a number of blocks on the read-write storage system is greater than or equal to the threshold size.

15. The system of claim 14 wherein the filesystem structure is stored on the second array of storage devices.

16. The system of claim 14 wherein the first array of storage devices is shared with at least one other system.

17. The system of claim 14, further comprising:

transfer logic to copy data from the first array of storage devices to the second array of storage devices; and filesystem logic to alter the filesystem to reference the copied data on the second array of storage devices.

18. The system of claim 14, wherein the first array of storage devices and the second array of storage devices are separate redundant arrays of independent disks ("RAIDs").

* * * * *